March 16, 1943.　　R. R. BRADSHAW　　2,313,985

METHOD OF MOLDING PLASTICS

Filed May 20, 1940

INVENTOR.
Russell R. Bradshaw

BY

*Griswold & Burdick*
ATTORNEYS

Patented Mar. 16, 1943

2,313,985

UNITED STATES PATENT OFFICE

2,313,985
METHOD OF MOLDING PLASTICS

Russell R. Bradshaw, Midland, Mich., assignor to The Dow Chemical Company, Midland, Mich., a corporation of Michigan Application May 20, 1940, Serial No. 336,238

7 Claims. (Cl. 18—55)

This invention relates to an improved method of molding organic plastics and more particularly concerns a method for improving the surface characteristics of large injection molded articles. It relates as well to the new products obtainable by the said method.

Heretofore, when attempts have been made to injection mold relatively large objects, such as plates, automobile headlight lenses, building blocks, automobile dash-board panels, etc., several disadvantages have been encountered. For example, the article may frequently show flow marks, other undesired surface irregularities, dullness, etc., resulting from non-uniform temperatures in the mold or from local cooling of the plastic entering the mold before reaching the extremities of the mold farthest from the sprue. This is especially true in molding articles of relatively thin section. In addition, the article may become partially decomposed or embrittled by contact with the hot bare metal of the mold. Yet another difficulty arises from the molded article adhering to the walls of the mold after cooling, making removal therefrom difficult and imparting a dull, rough surface to the article, which is difficult to buff or polish.

Various methods have been proposed for overcoming the aforementioned difficulties, but none have proven entirely satisfactory for a number of reasons. For example, it has been proposed to spray a coating of a lacquer or of a metal inert to the object being molded on the walls of the mold prior to introducing the plastic. This method, however, is relatively unsatisfactory because difficulty is often encountered in freeing the article from the mold, as the spray materials tend to bond the molded object to the walls of the mold. In addition, the use of a metal spray is expensive and often results in injuriously affecting the surface of the plastic body due to particles of the metal becoming embedded therein. Another proposed method is to line the mold with a thin metal sheet to prevent the molded object from sticking to the mold walls. This method is unsatisfactory due in part to the fact that it is practically impossible to avoid forming folds or ridges in the sheet which are transferred to the molding, thereby causing depressions or grooves therein which are not removable from the molded object without altering the shape thereof. Another method proposed to overcome the foregoing difficulties is to bond a sheet of a thermoplastic material to a molded article after the article has been cooled and removed from the die. However, this method is not entirely satisfactory because it is difficult to make the film adhere permanently to the object and evidence of discontinuity is often apparent.

It is accordingly one of the objects of the present invention to provide a method of injection molding plastic articles which will eliminate undesired surface irregularities and dullness in the finished product.

Another object is to provide a method as aforesaid whereby molded plastics may be easily and accurately reproduced having smooth hard surfaces bearing no surface irregularities other than those impressed thereon by the mold in which they are cast.

Still another object of the invention is to provide a method of molding plastics whereby the article may be easily ejected from the mold cavity after completion of the molding operation.

Other objects and advantages will be apparent as the description proceeds.

I have now found that a hard, smooth, glossy top-surface can be imparted to injection molded articles by placing in the mold opposite the sprue a composite organic thermoplastic sheet or film, one side of which is capable of becoming soft and tacky at the temperature of the injected plastic, and which is preferably of a composition compatible with the injected plastic, enabling it to adhere to or at least partially merge with the surface of the article being molded under the heat and pressure conditions encountered during the molding operation, and the other side of which is hard, non-tacky and abrasion resistant so that it will not adhere to the mold walls. A film of this type insulates the walls of the mold and prevents or inhibits the escape of heat therethrough, allowing the article to be injected at a uniform temperature thereby eliminating the major cause of flow marks. Examples of base films satisfactorily adapted to be used according to the invention and capable of being bonded to the plastic being molded, are those with one surface either not plasticized or slightly plasticized, and a softer heavily plasticized surface formed of the same or another plastic compatible with that being molded. In the treatment of injection molded ethyl cellulose, for example, such films may be those made up of a thin base film of ethyl cellulose alone to which is united a layer of a plasticized composition containing ethyl cellulose of low viscosity and of ethoxy value higher than about 46.5 per cent, thereby forming the heat and pressure sensitive adhesive surface. In this example, the harder, non-adhesive side of the film may be formed of any organo-soluble ethyl cellulose, preferably one of viscosity type greater than 30 centipoises. A film of this type is particularly well adapted to use when molding objects comprised of ethyl cellulose, but may, of course, be employed when molding other plastics to which the softer face of the film will adhere under molding conditions.

According to my invention, an article with the improved surface characteristics described and one capable of being easily released from the mold in which it is cast, may be injection molded in the following manner. A sheet of a composite thermoplastic film is made up of sufficient size to cover one surface of the article being molded and is inserted in the mold opposite the sprue in such a manner that when the plastic is injected into the mold the film is interposed between it and the mold wall. The soft, heat and pressure sensitive side of the film is, of course, facing away from the mold walls and toward the sprue from which the plastic is supplied. The mold is then closed and the plastic is injected thereinto through the sprue by movement of a plunger in the usual manner. As the molten plastic flows against the sensitive side of the film it becomes intimately bonded thereto, pressing the film in turn against the walls of the mold to the desired form and shape. The molded article thus acquires the desired shape as well as a smooth surface. After sufficient plastic has been injected to fill the mold, the mold is cooled to allow the plastic to harden, opened, and the molded object removed therefrom. The finished product, injection molded in this manner, presents a smooth, hard, glossy, flawless top-surface. Because of the manner in which the composite film sheet is selected and applied, no evidence of discontinuity is apparent between the film and the plastic object. By way of contrast, objects molded under otherwise similar conditions, but without employing a thermoplastic film, are found to contain surface irregularities and to be less easily removed from the mold.

When molding shallow articles, such as plates or platters, the hot plastic entering the die will effect the necessary shaping of the film. However, when molding articles the surfaces of which are considerably curved, as in the case of automobile headlight lenses, it is desirable first to draw the composite thermoplastic film to the shape of the mold before injecting the plastic. This may be accomplished conveniently by placing a sheet or film in the mold, heating it, and drawing it to the proper shape by pressing it against the mold surface by applying air pressure, or the like, and then to inject the plastic against the shaped film. Alternatively, a second pair of dies may be used for the drawing operation, consisting of a female portion which is an exact duplicate of the female portion of the injection molding die, though it may be of cheaper construction, and a close fitting male portion. These dies will be capable of being heated and will be used in the customary manner for drawing a thermoplastic film to shape.

Reference is made to the accompanying drawing in which, in the interest of clarity, certain features are shown on a somewhat exaggerated scale.

Figure 1:
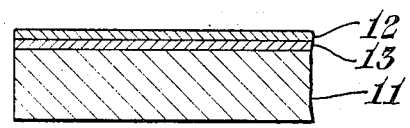
Figure 1 represents an enlarged cross-section of a flat injection molded article to one side of which there is firmly bonded a composite film.

Referring to Figure 1, the composite film with which the body of the molded article 11 is coated is composed of two layers 12 and 13.

Figure 2:
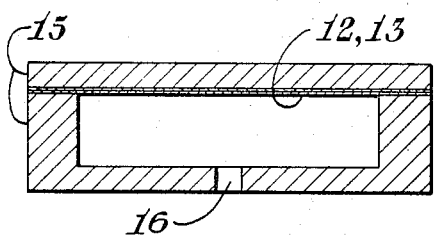
Figure 2 represents a cross-section of a mold for producing a flat injection molded article and shows a composite film in place within the mold just prior to injection of the thermoplastic molding material.
Figure 3:
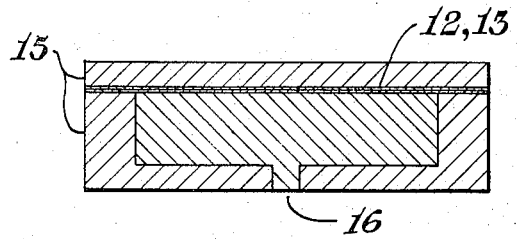
Figure 3 is the same as Figure 2 after injection of the thermoplastic molding material.
Figure 4:
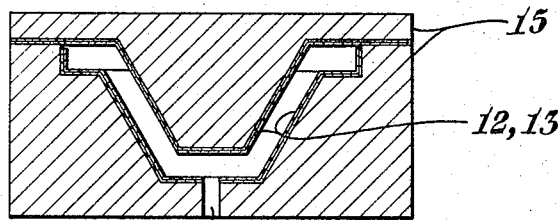
Figure 4 represents a cross-section of a mold for producing an irregularly shaped injection molded article and shows previously drawn composite films within the mold just prior to injection of the thermoplastic molding material.

The outside layer 12 of the composite film is a hard abrasion-resistant composition which did not become tacky at the temperature at which the article 11 was molded and showed no tendency to stick to the mold. The inner or bonding layer 13 is the result of the commingling or fusion under the molding conditions of the injected thermoplastic material with the side of the film which became soft and tacky and compatible with the injected material under the conditions of molding. The bonding layer 13 is not separable by nondestructive means from either the injected material 11 or the hard outer layer 12. Referring to Figures 2 and 4, sections of composite film 12, 13 of the type described and large enough to cover the portions of the surface of the molded article which it is desired to coat are inserted in the mold 15 with their softer sides toward the mold cavity so they will meet the thermoplastic material entering the mold through the sprue opening 16. A composite film adaptable to the coating of flat molded objects may be in the form of a flat sheet, Figure 2, and may, when convenient, be held in place by being clamped between the parts of the mold. When the article to be molded is irregular in shape, the composite film may previously be drawn by conventional means so that it fits snugly the irregularly shaped portion of the mold, Figure 4. Referring to Figure 3, the thermoplastic molding material is then injected through the sprue opening 16 and, due to the pressure exerted by the thermoplastic molding material on the composite film, the latter is pressed firmly against the mold surface, and, due to the temperature at which the molding operation is carried out, the adhesive side of the composite film becomes thoroughly bonded to, or partially fused with, the injected material to form the bonding layer 13 of the finished article. After cooling and ejection of the article from the mold, the composite film is found to be an integral part of the molded object, thus imparting to the latter a smooth, hard, abrasion-resistant surface.

The following examples illustrate specific methods of carrying out the invention, but are not to be construed as limiting the scope thereof.

*Example 1*

Into a mold suitable for molding plates and like objects 12 inches in diameter and 0.1 inch thick, was inserted a composite thermoplastic film about 0.0015 inch thick with the adhesive side toward the sprue opening. The hard, abrasion resistant surface of the film consisted of a high viscosity ethyl cellulose sheet approximately 0.00075 inch thick, and the soft adhesive side of the film consisted of a low viscosity ethyl cellulose plasticized with approximately 20 per cent of di-(paratertiarybutyl-phenyl)-mono-(5-tertiary-butyl-2-xenyl) phosphate and 10 per cent of di-(ortho-xenyl) mono-phenyl phosphate, of approximately 0.00075 inch thickness. A molding composition containing 100 parts by weight ethyl cellulose, 17 parts of Santicizer B-16, 6 parts of tri-(paratertiarybutyl-phenyl) phosphate, 2 parts of magnesium stearate, 1.5 parts of paraffin oil, and 2 parts of titanium oxide was then injected into the mold from the sprue. After the molded composition had been cooled, the mold was opened and the charge removed. The molded product was found to have a smooth, glossy top-surface, formed by the composite sheet intimately bonded thereto. It was free from surface defects and irregularities and there was no apparent discontinuity between the film and the molded object.

*Example 2*

A composite thermoplastic film of high viscosity ethyl cellulose as the base and an adhesive side consisting of a low viscosity ethyl cellulose plasticized with approximately 10 per cent of di-(ortho-xenyl) mono-phenyl phosphate, 5 per cent of di-(paratertiarybutyl-phenyl) mono-(5-tertiaryl-butyl-2-xenyl) phosphate, and 5 per cent diphenyl mono-(ortho-xenyl) phosphate, was inserted into a mold in a manner similar to that described in Example 1. A molding composition consisting of 100 parts by weight of ethyl cellulose, 8 parts Santicizer B-16, 4 parts tri-(paratertiarybutyl-phenyl) phosphate, 2 parts stearic acid, 2 parts paraffin oil, and 1.6 parts pigment was then injected into the mold and allowed to cool. The article, after removal from the mold, had a firmly adhering, pleasing appearing, lustrous top surface free from abrasions.

While the invention is particularly well adapted to the injection molding of large articles from relatively soft plastics, such as ethyl cellulose, it is also applicable to the molding of other plastics which are capable of being molded by injection methods. These include cellulose acetate, cellulose aceto-propionate, cellulose aceto-butyrate, polystyrene, methyl methacrylate, and other thermoplastic polymers.

When molding plastics other than ethyl cellulose, the composition of the composite film given in the illustrative examples will have to be altered accordingly. A heat and pressure sensitive adhesive surface will be employed which is adapted to adhere to the particular article being molded. For example, if the object being molded is of polystyrene, a film of nitro cellulose makes an excellent top-surface. Commonly, when molding polymers, films made up with the adhesive side of the same polymer as that of the object being molded but of lower molecular weight are satisfactory for use according to the invention.

Various modifications of the described procedure will occur to those skilled in the art and are to be included within the scope of the invention. For example, if it is desired to coat more than one surface of an article, this may be accomplished by placing composite films in the mold opposite each surface it is desired to coat, care being taken to leave an opening through one film adjacent the sprue to allow the plastic to enter the die. The plastic may then be injected in the usual manner, and enters the die between the two films, each of which is so positioned that the adhesive side faces away from the die and toward the body of the molded plastic. Color effects may be obtained by using colored films or films carrying decorations or indicia for surfacing the plastic molded object.

It is seen from the foregoing description that the present invention provides a method of forming hard abrasion resistant and weather resistant surfaces on plastic articles which have been molded from relatively soft plastics, and that the articles so produced are improved both as to appearance and as to general utility over molded articles of the same shape, size and composition which have not been protected in the manner here described.

Other modes of applying the principle of my invention may be employed instead of those explained, change being made as regards the method herein disclosed or the materials employed, provided the step or steps stated by any of the following claims be employed or the product claimed in any of the following claims be obtained.

I therefore particularly point out and distinctly claim as my invention:

1. In a method of molding by injection an organic thermoplastic article, the steps which consist in inserting into the mold between successive injections a composite thermoplastic sheet, of which the face directed toward the mold cavity is capable of becoming soft and tacky at the temperature at which the plastic is injected, and which is of a composition compatible with the injected plastic, and the other surface of which is hard, non-tacky and abrasion resistant and has no tendency to adhere to the mold walls under the conditions of temperature and pressure existing during the injection operation, injecting into the cavity of the said mold a fused organic thermoplastic material in quantity sufficient to fill the mold, thereby to draw the composite thermoplastic film to the contour of the mold face and to firmly bond the film to the injected thermoplastic material, and thereafter cooling the plastic within the mold and ejecting the composite molded and coated article.

2. In a method of molding by injection an article of ethyl cellulose, the steps which consist in inserting into the mold between successive injections a composite film of ethyl cellulose, of which the face directed toward the mold cavity is capable of becoming soft and tacky at the temperature at which the ethyl cellulose is injected, and the other surface of which is hard, non-tacky and abrasion resistant and has no tendency to adhere to the mold walls under the conditions of temperature and pressure existing during the injection operation, injecting into the cavity of the said mold a charge of ethyl cellulose in quantity sufficient to fill the mold, thereby to draw the composite ethyl cellulose film to the contour of the mold face and to firmly bond the film to the injected ethylcellulose, and thereafter cooling the ethyl cellulose within the mold and ejecting the composite molded and coated article.

3. In a method of molding by injection an article of polystyrene, the steps which consist in inserting into the mold between successive injections a composite film of nitrocellulose, of which the face directed toward the mold cavity is capable of becoming soft and tacky at the temperature at which the polystyrene is injected, and the other surface of which is hard, non-tacky and abrasion resistant and has no tendency to adhere to the mold walls under the conditions of temperature and pressure existing during the injection operation, injecting into the cavity of the said mold a charge of polystyrene in quantity sufficient to fill the mold, thereby to draw the composite nitrocellulose film to the contour of the mold face and to firmly bond the film to the injected polystyrene, and thereafter cooling the polystyrene within the mold and ejecting the composite molded and coated article.

4. In a method of molding by injection an organic thermoplastic article, the steps which consist in inserting into the mold between successive injections a composite thermoplastic sheet previously drawn to the contour of the mold, of which the face directed toward the mold cavity is capable of becoming soft and tacky at the temperature at which the plastic is injected, and which is of a composition compatible with the injected plastic, and the other surface of which is hard, non-tacky and abrasion resistant and has no tendency to adhere to the mold walls under the conditions of temperature and pressure existing during the injection operation, injecting into the cavity of the said mold a fused organic thermoplastic material in quantity sufficient to fill the mold, thereby to firmly bond the composite thermoplastic sheet to the injected thermoplastic material, and thereafter cooling the plastic within the mold and ejecting the composite molded and coated article.

5. In a method of molding by injection an organic thermoplastic article, the steps which consist in inserting into the mold between successive injections a composite thermoplastic sheet of sufficient size to cover the entire inside surface of the mold except that part directly opposite the sprue opening, of which the surface directed inward toward the mold cavity is capable of becoming soft and tacky at the temperature at which the plastic is injected, and which is of a composition compatible with the injected plastic, and the other surface of which is hard, non-tacky and abrasion resistant and has no tendency to adhere to the mold walls under the conditions of temperature and pressure existing during the injection operation, injecting into the cavity of the said mold a fused organic thermoplastic material in quantity sufficient to fill the mold, thereby to draw the composite thermoplastic film to the contour of the mold face and to firmly bond the film to the injected thermoplastic material, and thereafter cooling the plastic within the mold and ejecting the composite molded and coated article.

6. An injection molded thermoplastic article having firmly bonded to the surface thereof a composite thermoplastic film comprising an external layer which is hard and abrasion-resistant at the injection temperature and an inner layer which is soft, tacky and compatible with the injected thermoplastic material at the injection temperature.

7. An injection molded ethylcellulose article having firmly bonded to at least a portion of the surface thereof a composite ethylcellulose film comprising an external layer which is hard and abrasion resistant at the injection temperature and an inner layer which is soft, tacky and compatible with the injected ethylcellulose at the injection temperature.

RUSSELL R. BRADSHAW.